United States Patent [19]
El-Sayed

[11] Patent Number: 6,090,858
[45] Date of Patent: Jul. 18, 2000

[54] SHAPE CONTROL METHOD FOR NANOPARTICLES FOR MAKING BETTER AND NEW CATALYSTS

[75] Inventor: Mostafa A. El-Sayed, Atlanta, Ga.

[73] Assignee: Georgia Tech Reseach Corporation, Atlanta, Ga.

[21] Appl. No.: 09/044,684

[22] Filed: Mar. 18, 1998

Related U.S. Application Data

[60] Provisional application No. 60/039,343, Mar. 18, 1997.

[51] Int. Cl.$^7$ .............................. C09K 3/00; B01J 23/42; C01G 55/00; B01F 17/52
[52] U.S. Cl. .............................. 516/97; 516/78; 117/938; 75/370; 502/339; 423/22
[58] Field of Search ........................ 516/97, 78; 117/938; 75/370; 502/339; 423/22

[56] References Cited

U.S. PATENT DOCUMENTS

| | | | |
|---|---|---|---|
| 1,629,161 | 5/1927 | Herrmann et al. | 516/97 |
| 3,334,995 | 8/1967 | Gaspar | 516/97 |
| 3,892,557 | 7/1975 | Lutz et al. | 75/370 |
| 3,992,197 | 11/1976 | Wetzold | 75/370 |
| 4,059,541 | 11/1977 | Petrow et al. | 516/88 |
| 5,187,209 | 2/1993 | Hirai et al. | 516/78 |
| 5,240,640 | 8/1993 | Siiman et al. | 252/62.51 |

OTHER PUBLICATIONS

Ahmadi et al., "Shaped–Controlled Synthesis of colloidal Platinum Nanoparticles", Science, vol. 272, (Jun. 28, 1996) pp. 1924–1926.

Henglein et al., Absorption and Some Chemical Reactions of Colloidal Platinum in Aqueuous Solutions J. Phys. Chem., (1995) 99, pp. 14129–14136.

Rampino et al., "Preparation of Palladium and Platinum Synthetic High Polymer Catalyst and the Relationship between particle Size and Rate of Hydrogenation", J. Amer. Chem. , 63, p. 2745–2749 (1942).

*Primary Examiner*—Richard D. Lovering
*Assistant Examiner*—Daniel S. Metzmaier
*Attorney, Agent, or Firm*—Thomas, Kayden, Horstemeyer & Risley, LLP

[57] ABSTRACT

A method for shape controlled synthesis of colloidal metal nanoparticles includes providing a solution of $8\times10^{-5}$ M $K_2PtCl_4$ and water in a reaction vessel and maintaining the vessel at a constant temperature of approximately 25° C. 0.1 M sodium polyacrylate is then added to the solution. Thereafter, argon gas is bubbled through the solution for approximately 20 minutes, and then hydrogen gas is bubbled through the solution for approximately 5 minutes to saturate the solution and so that platinum ions in the solution are reduced. The reaction vessel is sealed and the solution is allowed to stand for approximately 12 hours, whereby platinum colloidal nanoparticles possessing a particular shape distribution and size distribution are formed. The shape and size distributions of produced nanoparticles can be manipulated by changing the ratio of the concentration of sodium polyacrylate to platinum ions in a subsequently formed solution while maintaining all other variables constant.

8 Claims, 3 Drawing Sheets

Sample 1

Sample 2

SHAPE CONTROL METHOD FOR NANOPARTICLES FOR MAKING BETTER AND NEW CATALYSTS

RELATED APPLICATIONS

This application claims priority to and the benefit of a U.S. Provisional Application Ser. No. 60/039,343, filed on Mar. 18, 1997.

FIELD OF THE INVENTION

The present invention relates generally to the production of colloidal particles. More specifically, the present invention relates to the production of metal nanoparticles of various shapes and sizes for use in applications, for example but not limited to, catalysis.

DESCRIPTION OF THE RELATED ART

Catalysis is a reaction process that occurs on the surface of a solid, and more specifically, catalysis is a reaction involving a solid's surface atoms. The relationship of the number and type of bonding of surface atoms to catalysis reactivity is such that catalysis becomes more active on a given surface when more atoms become exposed to that surface. Increasing the number of exposed atoms on the surface of a solid is typically accomplished by decreasing the relative size of the particles comprising the solid. Once a particle reaches a size between $1\times10^{-9}$ m and $1\times10^{-6}$ m, the surface area of the particle compared to the particle's volume becomes quite large. Particles possessing these characteristic dimensions can be prepared as colloidal particles which possess unique physical properties, such as not precipitating out of solution due to aggregation, among others. The smaller of these colloidal particles, (i.e., those with dimensions of approximately $1\times10^{-9}$ m), are known as nanoparticles.

Nanoparticles are of particular interest because of their use as catalysts, photocatalysts, adsorbents and sensors, and ferrofluids, and because of their applications in optical, electronic, and magnetic devices. Since catalytic reactivity depends on the size and the shape of the colloidal particles used in an application, the synthesis of well-controlled shapes and sizes of colloidal particles, and particularly nanoparticles, due to their increased reactivity, can be critical.

Many prior studies on colloidal particles have focused on the control of particle sizes and particle growth kinetics and have related particle size to catalytic activity. Moreover, research has shown that the degree of polymerization and the concentration of the stabilizing polymer (capping material) used to produce the colloidal particles influence the size distribution, stability, and catalytic activity of colloidal particles. For example, it has been shown that a higher ratio of capping material to metal produces smaller gold (Au) particles. However, shape control has been much more difficult to achieve.

It is known that different surfaces of large metallic crystals have different catalytic properties. The surface of different nanoparticle shapes have different crystal surfaces and are thus expected to have different specific catalytic properties, with anticipated enhanced catalytic efficiency as compared to macroscopic crystals.

Therefore, it is desirable to provide a method of producing nanoparticles in a manner that allows for controlled production of nanoparticles of a desired shape, as well as size.

SUMMARY OF THE INVENTION

Briefly described, the present invention includes a method for the synthesis of colloidal metal nanoparticles with controlled shapes. The method includes manipulating the ratio of the concentration of a capping material to that of metal ions in a solvent that is used to produce the nanoparticles, thereby changing the distribution of synthesized nanoparticle shapes.

In accordance with the present invention, nanoparticles are prepared by the standard method of Rampino and Nord and Henglein, et al., whereby a solution of a metal salt and water is prepared in a reaction vessel, to which a capping material, such as sodium polyacrylate, sodium monoacrylate, etc., is added. Argon (Ar) gas is then bubbled through the solution for several minutes. The metal ions are then reduced by bubbling Hydrogen ($H_2$) gas at a high flow rate through the solution in order to saturate the solution for several minutes. The reaction vessel is then sealed, with the solution left to sit for approximately 12 hours. Subsequent absorption spectrum analysis reveals the formation of colloidal metal nanoparticles of a particular shape distribution, including combinations of cubic, tetrahedra, polyhedra and irregular-prismatic particles.

By utilizing the same method of synthesis, including using the same capping material, the same salt, the same temperature and the same solvent, but by changing the ratio of the concentration of the capping material to that of the metal ions, different sizes, shapes and shape distributions of metal nanoparticles are produced.

Therefore, it is an object of the present invention to provide an improved method of synthesizing metal colloidal nanoparticles that allows for controlled production of nanoparticles of a desired size and shape.

It is another object of the invention to provide an improved method of synthesizing metal colloidal nanoparticles of a desired size and shape that is accomplished at room temperature by manipulating the concentration of a capping material relative to the metal ions present in the synthesizing solution.

It is yet another object of the invention to provide an improved method of synthesizing metal colloidal nanoparticles of a desired size and shape that is easily duplicated, and thus well suited for mass production applications, with the result being a controlled production of nanoparticles particularly sized and shaped and of a sufficient quantity for use in commercial applications.

Other objects, features and advantages of the present invention will become apparent upon reading the following specification, when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. The components in the drawings are not necessarily to scale, emphasis instead being placed upon clearly illustrating principles of the present invention.

DETAILED DESCRIPTION OF THE INVENTION

Figure 1:
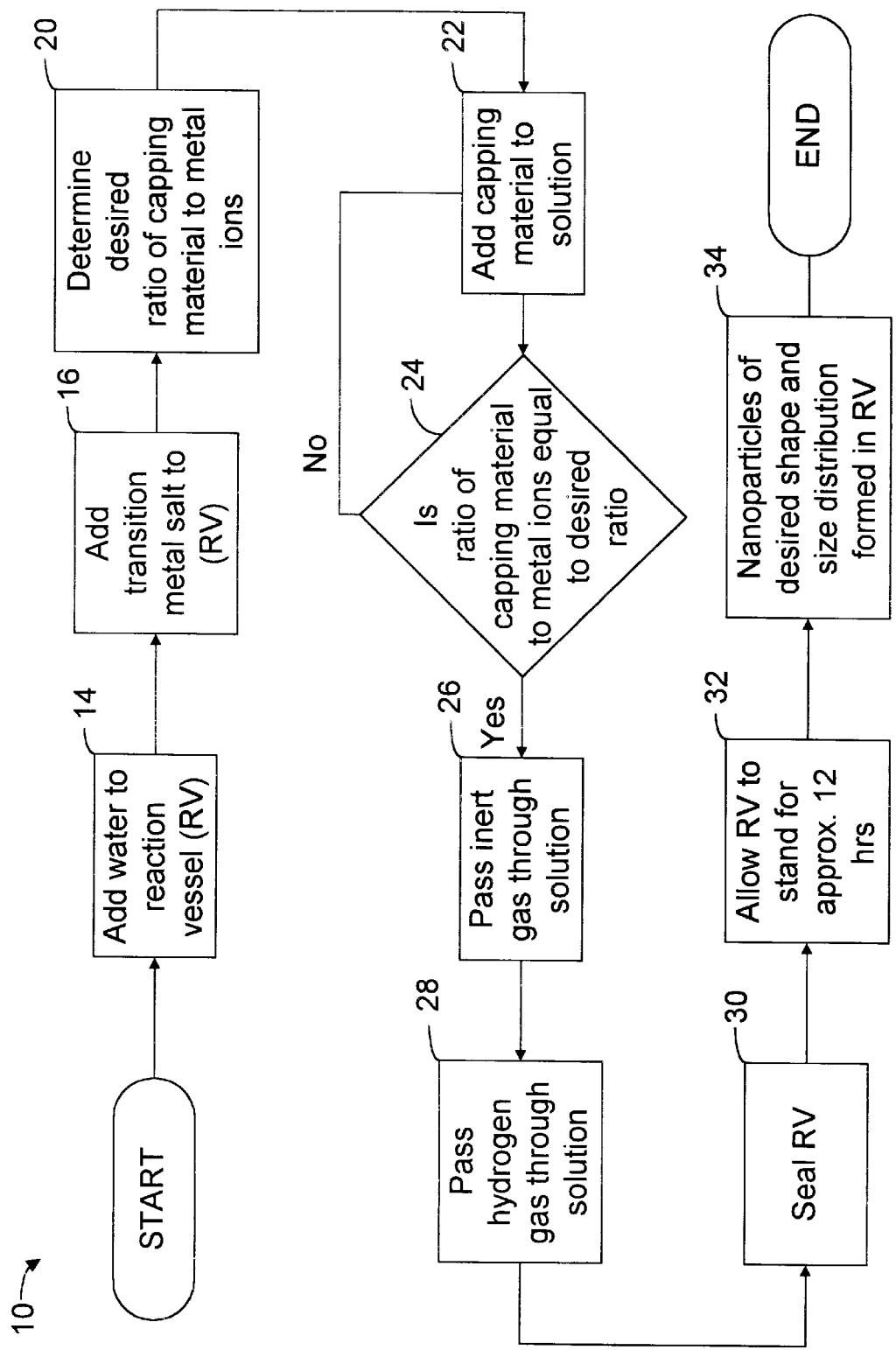
FIG. 1 is a flow chart illustrating the production of nanoparticles with a specific shape and size distribution in accordance with the present invention.

Reference will now be made in detail to the description of the invention as illustrated in the drawings. As shown in FIG. 1, and in accordance with the present invention 10, synthesis of colloidal metal nanoparticles with controlled shapes is achieved by changing the ratio of the concentration of a capping material to that of metal ions, thereby changing the distribution of nanoparticle shapes. For purposes of illustration only, the inventive method of the present invention will be described below in relation to the production of platinum nanoparticles. However, the method also can be successfully practiced with a variety of elements, with particular emphasis placed on other transition metals, such as rhodium, paladium, etc., which are initially utilized in the invented method in the form of metal salts. Additionally, for illustration purposes only, the present invention discusses three samples having a 1:1, 2.5:1 and 5:1 ratio of capping material to metal ions. However, it should be apparent to one skilled in the art upon reading the present disclosure that other ranges are also possible.

Transition metal nanoparticles, i.e. platinum nanoparticles, are prepared in several samples according to the standard method of Rampino and Nord and Henglein, et al, as shown by method 10 in FIG. 1, with the samples being produced at room temperature (approximately 25° C.). Although transition metal salts are utilized in the preferred embodiment, other elements also can be utilized, as previously mentioned.

In the preferred embodiment, 2 ml of a 0.01 M $K_2PtCl_4$ solution is added to the reaction vessel in block 16, and enough water is added in block 14 to make a 250 ml solution of $8\times10^{-5}$ M solution of the salt. A determination is made, in block 20, as to the desired ratio of capping material to metal ions for the solution in the reaction vessel. Then, as depicted by blocks 22 and 24, an appropriate quantity of capping material is added to the solution until the desired ratio is achieved. In the preferred embodiment, 0.1 M sodium polyacrylate is added in block 22 as the capping material 22.

As shown by block 26, an inert gas, such as Argon (Ar), is then passed through the solution, such as by bubbling, for approximately 20 minutes. The Platinum ions ($Pt^{2+}$) formed in the solution are then reduced by passing Hydrogen ($H_2$) gas through the solution at a high enough flow rate to allow for hydrogen saturation of the solution for approximately 5 minutes, as depicted by block 28. The reaction vessel is then sealed in block 30, and the solution in the reaction vessel is left to stand for approximately twelve hours, as shown by block 30. After twelve hours have elapsed, the solution turns lightly golden with absorption spectrum analysis revealing the formation of colloidal Pt nanoparticles, as shown by block 34.

In accordance with the present inventive method, varying the ratio of capping material to metal ions, while holding all other variables approximately constant, produces the desired result of allowing for repeatable controlled production of metal nanoparticles of particular shapes and sizes. To demonstrate the correlation between the concentration of capping material and metal ions, and controlling the shapes of nanoparticles produced, the preparation of several samples, samples 2 and 3, are illustrated hereinbelow.

Samples 1, 2 and 3 are produced in accordance with the inventive method 10 by respectively adding 0.2, 5 and 0.5 ml of a 0.1 M polyacrylate in block 22. Therefore, the concentration of the capping material to that of the metal ions is 1:1, 5:1, and 2.5:1 in samples 1, 2, and 3, respectively. Additionally, because the concentration of the capping material changes in the preparation of samples 1 through 3, the pH values of the samples are also different. Although the variation of pH in the three solutions is small, changing from 7.5 to 7.65 when the concentration of the capping material is changed by a factor of 5 (going from sample 1 to sample 2), the initial pH of the solutions can easily be adjusted to 7.5 in all three solutions by adding an acid, such as hydrochloric acid, or a base, such as sodium hydroxide, when appropriate.

Investigation of the structures of the Pt nanoparticles formed in the samples can be accomplished by using a device, such as a Hitachi HF-2000 field emission gun (a 200 kV transmission electron microscope (TEM) with a point-to-point image resolution of better than 0.23 nm and a lattice resolution of 0.1 nm), and recording the structural images digitally using a charge-coupled device camera, which allows for subsequent processing and quantitative modeling. Preparation of the TEM specimens is accomplished by dispersing Pt particles on amorphous carbon substrates, or C films, that are preferably less than 20 nm thick.

Figure 2:
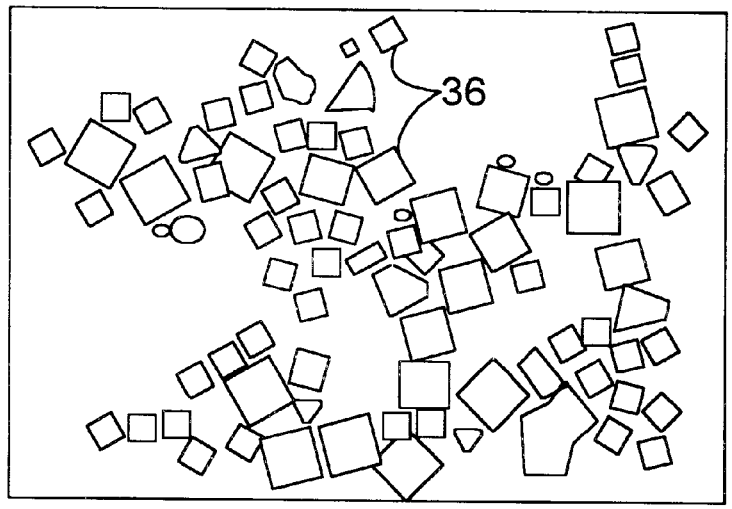
FIG. 2 is an illustration depicting the shape and size distribution of nanoparticles produced by a representative sample 1 as shown by a TEM.
Figure 3:
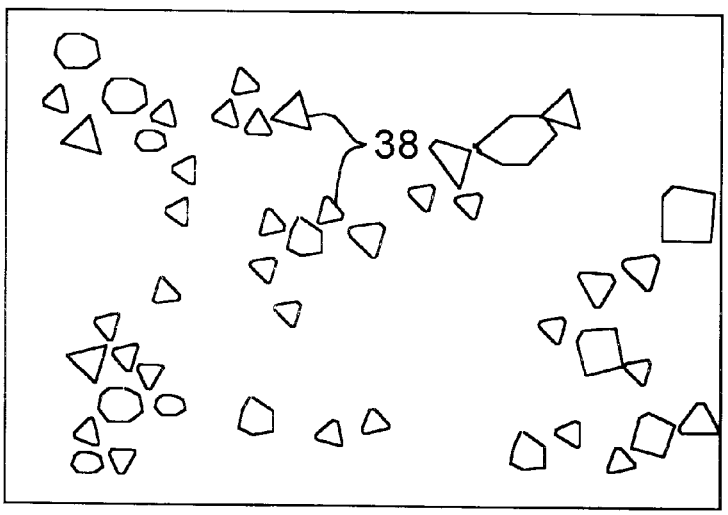
FIG. 3 is an illustration depicting the shape and size distribution of nanoparticles produced by a representative sample 2 as shown by a TEM.
Figure 4:
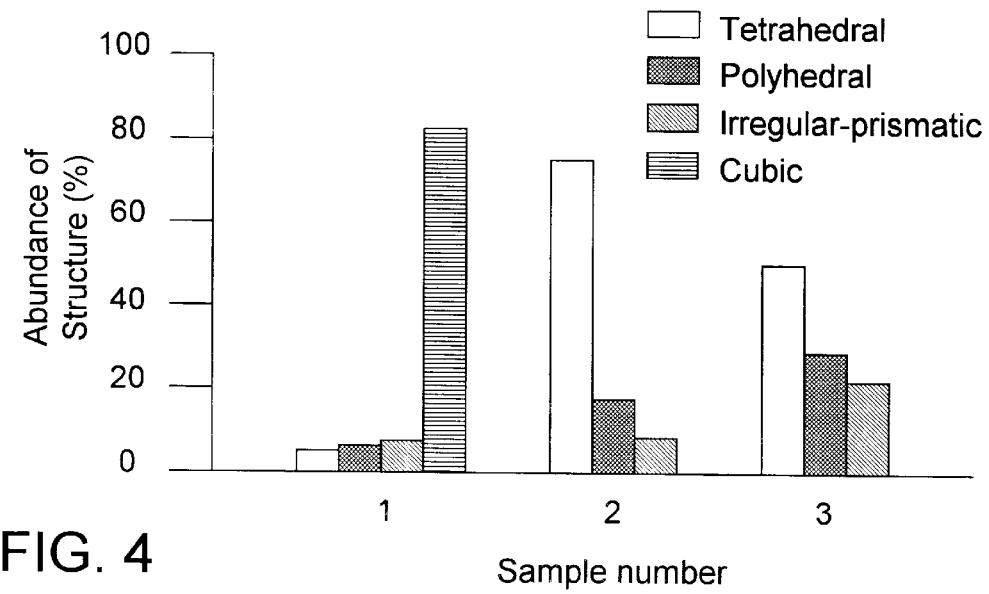
FIG. 4 is a histogram illustrating representative shape distributions present in samples of colloidal metal nanoparticles produced in accordance with the present invention.
Figure 5:
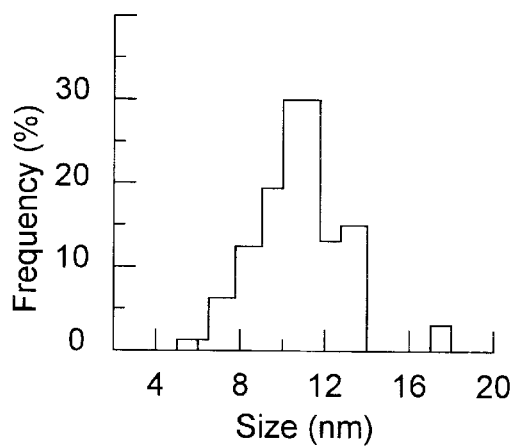
FIG. 5 is a graph illustrating representative size distributions of cubic nanoparticles present in sample 1 which is produced in accordance with the present invention.
Figure 6:
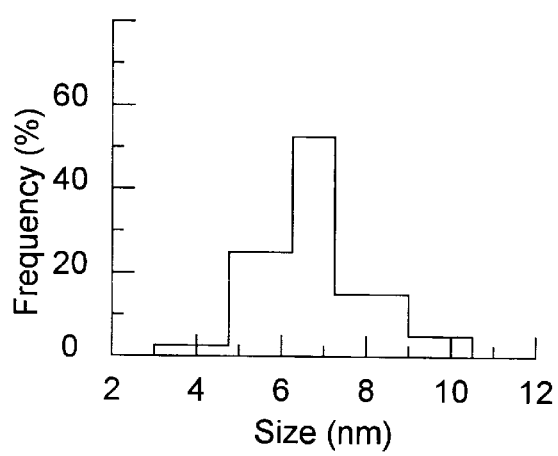
FIG. 6 is a graph illustrating representative size distributions of tetrahedra nanoparticles present in sample 2 which is produced in accordance with the present invention.

By tilting the prepared C films in the TEM, the three-dimensional shapes of the nanoparticles can be determined. Sample 1 (FIG. 2) predominately contains nanoparticles 36 with a square outline, as viewed with the TEM, which have been found to be cubic, whereas samples 2 (FIG. 3) and 3 contain high proportions of nanoparticles 38 with a triangular outline, as viewed with the TEM, which have been found to be tetrahedral. The shape (FIG. 4) and size distributions (FIGS. 5 and 6) of the particles can be determined from enlarged photographs of the TEM images by counting statistically viable numbers of nanoparticles. Sample 1, having the 1:1 ratio of capping material to metal ions, typically contains 80% cubic particles, while sample 2, having a ratio of 5:1 capping material to metal ions, is typically dominated by tetrahedra with some small percentages of polyhedra and irregular-prismatic particles. Sample 3, having a ratio of 2.5:1 capping material to metal ions, typically contains a mixture of tetrahedra, polyhedra, and irregular-prismatic particles.

The formation of tetrahedral and cubic particles in samples 1, 2, and 3 has been reproduced numerous times producing substantially similar results. For example, in each preparation of sample 2, about 60±10% of the relative population of nanoparticles have tetrahedral shapes. Additionally, the formation of cubic nanoparticles in sample 1 is reproducible to within 60±20% of the relative particle population. It has also been found that whenever the concentration of cubic particles in sample 1 decreases, the concentration of other identifiable shapes also decreases, with the concentration of shapeless particles increasing.

In order to make size distribution calculations, the longest sides of the two-dimensional images were used for cubes and tetrahedral nanoparticles, whereas for polyhedra nanoparticles the longest diameters were considered. In sample 1, cubic structures are dominant and other structures are minor.

The average size of the cubic particles in a typical sample 1 is 11.0±0.5 nm, with sizes ranging from 4 to 18 nm. The size distribution of tetrahedra formed in a typical sample 2 ranges from 4 to 10 nm, with an average size of 7.0±0.5 nm. Sample 3 showed a similar size distribution, with an average size of 8.0±0.5 nm, with the difference in the average sizes between samples 2 and 3 within the error range of the measuring instrument used. Similar average particle sizes (8.0 nm) are found for the polyhedra in samples 2 and 3, although the size distribution is typically wider in a sample 3 than in a sample 2. On average, smaller particles of irregular-prismatic structure are formed in a sample 2 than in a sample 3. In the latter, a wider distribution of irregular-prismatics also is typically formed.

Once the nanoparticles are prepared in a colloidal form as described above and the nanoparticles are stabilized by the polymer, the nanoparticles can be used as a catalyst either in the colloidal solution which is extracted from the reaction vessel, or the nanoparticles can be separated from the solution by forming films on a substrate for heat treatment. In the latter method, the polymer can be removed completely and the nanoparticles can be used in processes such as catalyzing gas reactions.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

Of particular note, the inventive method 10 of the present invention can be performed without the limitations of scale. Specifically, the method is well suited for large scale production without limitation to quantity of compounds used for production of nanoparticles, provided, however, that the concentrations of capping material to metal ions is held approximately constant for a desired size and shape distribution.

What is claimed is:

1. A method for producing colloidal nanoparticles utilizing capping material and metal ions selected from the group consisting of transition metals, comprising the steps of:
   providing a solution of a transition metal salt and water in a reaction vessel;
   determining a concentration ratio of a capping material to transition metal ions such that colloidal nanoparticles of a desired shape distribution will be produced when said concentration ratio of capping material to metal ions is present in said reaction vessel;
   mixing a quantity of said capping material in said solution such that said concentration ratio of said capping material to said transition metal ions in said solution is established;
   passing an inert gas through said solution;
   passing hydrogen through said solution so that said transition metal ions in said solution are reduced; and
   allowing said solution to stand in said reaction vessel until said colloidal particles of said desired shape distribution are formed in said solution;
   wherein said desired shape distribution is a distribution of one or more particles selected from the group consisting of: cubic particles, tetrahedra, polyhedra, and irregular-prismatic particles.

2. The method according to claim 1, wherein said allowing step further comprises the step of sealing said reaction vessel.

3. The method according to claim 1, wherein the step of passing inert gas through said solution is further defined as passing Argon gas through said solution.

4. The method according to claim 1, wherein the step of passing inert gas through said solution is further defined as passing inert gas through said solution for approximately 5 minutes.

5. The method according to claim 1, further comprising the step of maintaining said solution at a constant temperature of approximately 25° C.

6. The method according to claim 1, wherein said capping material corresponds to sodium polyacrylate and said metal ions correspond to platinum ions.

7. The method according to claim 1, wherein the step of passing hydrogen gas through said solution is further defined as bubbling hydrogen gas through said solution for approximately 20 minutes.

8. The method according to claim 7, wherein said metal salt corresponds to $K_2PtCl_4$.

* * * * *